(12) United States Patent
Daghini et al.

(10) Patent No.: US 7,661,453 B2
(45) Date of Patent: Feb. 16, 2010

(54) ANNULAR REINFORCING ELEMENT FOR A TYRE AND TYRE INCLUDING THE ANNULAR REINFORCING ELEMENT

(75) Inventors: Guido Luigi Daghini, Milan (IT); Luca Frisiani, Milan (IT); Pierangelo Misani, Monza (IT); Guido Riva, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 55 days.

(21) Appl. No.: 10/494,266

(22) PCT Filed: Oct. 30, 2001

(86) PCT No.: PCT/IB01/02048

§ 371 (c)(1),
(2), (4) Date: Nov. 1, 2004

(87) PCT Pub. No.: WO03/037660

PCT Pub. Date: May 8, 2003

(65) Prior Publication Data

US 2005/0087278 A1   Apr. 28, 2005

(51) Int. Cl.
*B60C 15/04* (2006.01)
(52) U.S. Cl. ..................................... 152/540
(58) Field of Classification Search ................. 152/540; 245/1.5
See application file for complete search history.

(56) References Cited

U.S. PATENT DOCUMENTS

| | | | |
|---|---|---|---|
| 1,522,798 A | 1/1925 | Beyea | |
| 1,774,748 A * | 9/1930 | Gore | 245/1.5 |
| 4,378,042 A * | 3/1983 | Inae et al. | 152/540 |
| 5,581,990 A | 12/1996 | Van Giel et al. | |
| 5,702,548 A | 12/1997 | Arnaud et al. | |

FOREIGN PATENT DOCUMENTS

| | | |
|---|---|---|
| DE | 42 34 562 A1 | 4/1994 |
| EP | 0 542 252 B1 | 6/1996 |
| EP | 0 856 422 A1 | 8/1998 |
| EP | 1 080 948 A1 | 3/2001 |
| EP | 0 928 680 B1 | 3/2003 |
| EP | 0 943 421 B1 | 5/2003 |
| FR | 2 678 544 A1 | 1/1993 |
| GB | 1 587 575 A * | 4/1981 |
| JP | 34-008805 U | 6/1959 |

(Continued)

OTHER PUBLICATIONS

English translation of JP 11-321249 A.*

*Primary Examiner*—Adrienne C Johnstone
(74) *Attorney, Agent, or Firm*—Finnegan, Henderson, Farabow, Garrett & Dunner, L.L.P.

(57) ABSTRACT

A tire for a vehicle wheel includes a carcass structure, a tread band extending circumferentially around the carcass structure, a belt structure circumferentially located between the carcass structure and the tread band, and at least one pair of sidewalls applied to the carcass structure in axially opposite positions. The carcass structure includes at least one carcass ply. Ends of the carcass structure are fastened to a pair of annular reinforcing elements, wherein each annular reinforcing element is incorporated in a respective bead of the tire includes at least one cord. The at least one cord includes at least one preformed metallic thread element.

17 Claims, 3 Drawing Sheets

FOREIGN PATENT DOCUMENTS

| | | | |
|---|---|---|---|
| JP | 61-88804 U | | 6/1986 |
| JP | 62181903 A | * | 8/1987 |
| JP | 02-175401 A | | 7/1990 |
| JP | 04078703 A | * | 3/1992 |
| JP | 04-183614 A | | 6/1992 |
| JP | 05163686 A | * | 6/1993 |
| JP | 6-22004 | | 3/1994 |
| JP | 06-211009 | | 8/1994 |
| JP | 10-305711 | | 11/1998 |
| JP | 10305710 A | * | 11/1998 |
| JP | 11-321247 A | * | 11/1999 |
| JP | 11 321249 A | | 11/1999 |
| JP | 2001-003279 A | | 1/2001 |
| JP | 2001-032183 A | | 2/2001 |
| WO | WO 99/028547 | | 6/1999 |
| WO | 00/39385 A1 | | 7/2000 |
| WO | 01/43957 A1 | | 6/2001 |

* cited by examiner

ANNULAR REINFORCING ELEMENT FOR A TYRE AND TYRE INCLUDING THE ANNULAR REINFORCING ELEMENT

CROSS-REFERENCE TO RELATED APPLICATIONS

This application is a national-phase entry under 35 U.S.C. § 371 from International Application No. PCT/IB01/02048, filed Oct. 30, 2001, in the International Bureau of the World Intellectual Property Organization, the content of which is relied upon and incorporated herein by reference.

BACKGROUND OF THE INVENTION

1. Field of the Invention

The present invention relates to a tyre for vehicle wheels, as well as to a circumferentially substantially inextensible annular element—usually called "bead core"—incorporated in said tyre.

More particularly, the present invention relates to a tyre for vehicle, wheels comprising a bead core with improved characteristics as regards flexibility and ductility thereof.

2. Description of the Related Art

A tyre generally comprises: a carcass structure formed by at least one carcass ply, the ends of which are folded back or in any case fastened to substantially inextensible annular elements, i.e. the so-called "bead cores"; a tread band and a belt structure situated between the carcass and the tread band; and a pair of sidewalls applied to said carcass structure in axially opposite positions. The tyre portion which comprises the bead core is called "bead" and performs the function of fixing the tyre on the respective rim. According to a structure of the traditional type, in a position radically external to said bead core, the bead comprises a rubber strip, conventionally called "bead filling", with a substantially triangular cross-section.

Generally, the rim on which the tyre is mounted comprises a central cylindrical well, from the axially opposite ends of which respective diverging surfaces extend axially outwards, said surfaces forming the "bead seats" of the tyre. Each of said surfaces terminates in a substantially vertical peripheral wall, so-called "flange" of the rim.

The function of the bead core is that of fixing the tyre on the rim and ensuring the transfer of forces and torques between tyre and rim.

The bead core, which is substantially inextensible in the circumferential direction, may be obtained from a single threadlike element, for example a steel wire, arranged in an annular configuration, or from a plurality of threadlike elements, for example several steel wires stranded together so as to define a cord or a plurality of cords, arranged in an annular configuration.

The internal diameter of the tyre bead (fitting diameter) coincides substantially with the diameter of the radially internal surface of the bead core, except for a difference between the two diameters due to the rubber coating of said threadlike element or plurality of threadlike elements forming the bead core itself, to the thickness of the folded-back portion of the carcass ply or plies, and to the presence of any elastomer reinforcing elements.

The diameter of the radially internal annular surface of the bead cores, and hence of the beads, of a tyre is smaller than the radially external diameter of the flange and is chosen so that, once the bead has been positioned in the respective bead seat of the rim, after passing over the flange, it is pushed by the pressure of the tyre inflating fluid along the diverging surface of the bead seat against the axially internal surface of the flange.

The fitting of a tyre on a respective rim is performed by using methods which are well known to the person skilled in the art.

In greater detail, said fitting operation starts with deformation (ovalisation) of a bead of the tyre so that, when the latter is positioned facing the rim, a portion of said bead is able to pass over the flange. Successively, the rest of said bead is also completely passed over the flange such that the bead is positioned in the closest bead seat. Then said bead is pushed axially towards the opposite bead seat so as to cause it to fall into the cylindrical central well of the rim. In this way, once said bead is located inside the abovementioned central well, the equatorial plane of the tyre may be inclined with respect to the equatorial plane of the rim so as to allow also the opposite bead to pass over the flange and be positioned in the corresponding bead seat, by means of ovalisation thereof (and hence of ovalisation of the respective bead core). Finally, the tyre is inflated so that both the beads come into abutment against the axially internal surfaces of the flange.

Owing to the rigidity of the bead cores, the fitting/removal operations of the tyre onto/from the rim require the use of levers with which it is possible to apply a force sufficient to deform the bead core, modifying the configuration from a substantially circular one to an oval one, so as to allow, as mentioned above, the bead to pass over the flange.

However, the use of levers acting on the threadlike elements forming the bead core may result in the elastic strain limits of said elements being exceeded locally. This fact is particularly undesirable since it may have a negative effect on the structural strength properties of the bead core during the travel of the tyre and, in some cases, may also result in breakage of one or more of said threadlike elements.

Different types of bead cores are known in the art.

For example, a typical bead core structure is the so-called "Alderfer" structure which has a configuration of the type "m×n", where "m" indicates the number of axially adjacent threadlike elements or cords (obtained by stranding at least one pair of threadlike elements) and "n" indicates the number of radially superimposed layers of said threadlike elements (or said cords). This structure is obtained by using a rubberized strip comprising a predefined number of—textile or metallic—threadlike elements or cords and by, spirally winding (coiling) said rubberized strip onto itself so as to form a desired number of layers arranged radially superimposed one on top of the other. This constructional method allows the formation of cross-sectional contours of the bead core which are of a substantially quadrangular type. Examples of Alderfer structure are, in fact, 4×4, 5×5 or 4×5 structures.

A further conventional bead core structure consists in the so-called "single-thread bead core". This is formed from a single rubberized threadlike element (or, single cord) which is wound spirally so as to form a first layer of axially adjacent turns; then, in a position radially external to said first layer, the same threadlike element (or the same cord) is further coiled so as to form a second layer in a position radially external to the first layer, and so on, so as to form several radially superimposed layers, each layer being able to have a number of turns different from that of the layers radially adjacent thereto. Therefore, by varying the number of turns in each layer, it is possible to obtain cross-sectional contours of the bead core with different geometrical forms, for example a hexagonal shaped cross-section. A regular hexagonal bead core may be formed, for example, by means of 19 windings arranged in the configuration: 3-4-5-4-3. This series of numbers indicates that the individual rubberized threadlike element (or single cord) is coiled so as to form firstly three turns axially adjacent to each other to form a first layer; then four turns axially adjacent to each other are provided in succession so as to form a second layer radially superimposed on the first layer, followed by five turns, axially adjacent to each other, so as to form a third layer radially superimposed on the second layer, then four turns axially adjacent to each other so as to form a fourth layer radially superimposed on the third layer and finally three turns axially adjacent to each other so as to form a fifth layer radially superimposed on the fourth layer.

A further conventional bead core structure is obtained by using a plurality of rubberized threadlike elements (or cords), each individual threadlike element (or cord) being radially coiled onto itself so as to form a column of radially superimposed wound turns. Several columns of turns, possibly with a different vertical extension (namely different number of wound turns radially superimposed on each other), axially adjacent to each other, thus form the abovementioned bead core. Preferably, the axially opposite end sections of one or more carcass plies of the tyre are arranged between one or more of said columns of wound turns and kept in the correct working position by said columns of wound turns. This type of bead core is described, for example, in the patent applications EP-943,421, EP-928,680 and WO 01/43957 in the name of the same Applicant.

So-called "twisted" bead cores are furthermore known in the art. This type of bead core has a central core, for example obtained from a single threadlike element which is welded end-to-end so as to form a circle, around which a threadlike element is spirally wound and finally joined to itself.

The number of turns performed by the threadlike element around the core, before joining, as well as the number of wires wound around the core and/or the number of crown configurations created around said core, determine the structural strength which is to be imparted to said bead core.

The twisted bead core is particularly advantageous with regard to the degree of flexibility which it is able to ensure, although manufacture thereof is particularly complex and therefore both time-consuming and costly.

As mentioned above, since the fitting/removal operations of the tyre onto/from the rim require deformation (ovalisation) of the bead core, in addition to the structural strength characteristics necessary for ensuring optimum anchoring of the tyre to the rim, the bead core must have an adequate flexibility so as to allow said operations to be performed as easily as possible and without causing permanent (plastic) deformation of the threadlike elements or some of them forming said bead core.

With reference to the types of bead core known in the art, as mentioned above, the flexibility characteristics may be varied by modifying the arrangement of the threadlike elements (or cords) in the various layers forming the bead core itself or, in the case of the twisted bead core, by modifying the relative arrangement of the core threadlike elements and the crown threadlike elements so that said threadlike elements contribute to the stress applied at varying degrees.

Moreover, the flexural rigidity of a bead core may be reduced by decreasing the flexural rigidity of the threadlike elements (or cords) which form it. In the case of a single threadlike element, since its flexural rigidity is proportional to the fourth power of its diameter, by reducing the diameter of the threadlike element it is possible to reduce the flexural rigidity. For example, the use of a single threadlike element with a diameter of 0.89 mm (using a high carbon content steel, with a minimum breaking load of 1350 N) instead of a single threadlike element with a diameter of 0.96 mm (using a standard carbon content steel, with a minimum breaking load of 1350 N) ensures the same structural strength of the bead core, but reduces the flexural rigidity thereof by 35%. At the same time, owing to the reduction in the diameter of the rubberized single threadlike element (and therefore of the total quantity of rubberizing compound used), it is possible to obtain a bead core structure which is lighter and more compact. The reduction in the diameter of the threadlike elements is frequently used in order to increase the flexibility of "Alderfer" and "single-thread" bead cores.

Among the bead cores mentioned above, the "twisted" bead core, because of its particular constructional characteristics, results in better fitting/removal operations of the tyre onto/from the rim since the central core ensures a final geometry of the bead core which is of an optimum nature, the overlying crowns ensure an excellent flexibility and, last but not least, the central-core/crown assembly guarantees the required structural strength.

Therefore, from that stated above it may be concluded that the characteristics required of the materials used in the production of a bead core, or rather of the threadlike elements forming the bead core, are numerous. In particular, during use, namely during the travelling of a vehicle, the main property required of a tyre bead core is the structural strength, to which the tensile strength (or resistance to tensile stress) of the threadlike elements forming said bead core contributes. Moreover, as mentioned above, during the conventional fitting/removal operations of a tyre onto/from a respective rim, the materials forming the bead core must have optimum flexibility and ductility characteristics.

However, such a combination of characteristics is not simple to be achieved since they are mutually exclusive in that the improvement of one of said characteristics results in a worsening of at least another one of said characteristics.

In the known art, in order to avoid permanent local deformations in the area of the bead (for example due to the use of levers during the fitting/removal operations of the tyre onto/from the rim), it has been proposed to subject the threadlike elements (or the cords) of the bead core to a heat treatment able to ensure an increase in the elongation at break of said threadlike elements (or cords).

However, said increase is obtained to the detriment of the tensile strength and the yield point which, due to said heat treatment, decrease significantly as shown by the load/deformation curves typical of a high carbon content steel traditionally used for the construction of bead cores. In fact, from said curves it can be determined that, with an elongation at break greater than, for example, 5%, the corresponding yield point is generally equal to about 0.20 (or less). The outcome of this, therefore, is that the material is subjected to a local plastic deformation which can no longer be recovered, this meaning that, once fitting of the tyre on the rim has been completed, the anchoring effect of the bead core on said rim will inevitably adversely affected.

An example of a bead core obtained from heat-treated cords is described in the document U.S. Pat. No. 5,702,546. In particular, said document describes a tyre, the carcass plies of which are not folded back around conventional bead cores, but are gripped and fastened between turns of cords arranged circumferentially so as to form several adjacent rows performing the function of bead cores. According to said document, the elastic and plastic elongation properties of said cords have been modified by means of heat treatment in order to obtain suitable tensile strength, flexibility and ductility values.

The Applicant has perceived that there is the need for a bead core for tyres to guarantee both a satisfactory structural strength such as to ensure an efficient anchoring of the tyre to the rim and an adequate flexibility such as to allow the bead core to be deformed elastically, for example during the fitting/removal operations of a tyre onto/from a respective rim.

In particular, the Applicant has perceived that a bead core for tyres must guarantee a satisfactory structural strength and a suitable flexibility in the case where the tyre is travelling in an at least partially deflated condition, for example due to a puncture.

SUMMARY OF THE INVENTION

The Applicant has found that, in accordance with the present invention, it is possible to satisfy both the abovementioned requirements of structural strength and flexibility by providing a bead core for tyres comprising at least one preformed, metallic, threadlike element which has a wide elastic range.

In accordance with the present invention, said at least one preformed metallic threadlike element preferably has, moreover, a high elongation at break.

The Applicant has found that, during working conditions, the tyre bead is forced along the inclined surface of its bead seat and is pressed against the axially internal surface of the rim flange by the pressurised air introduced inside said tyre.

Therefore, when the tyre is in an at least partially deflated condition, the force exerted by the pressurised air against said bead is not present or is substantially decreased.

The result is that the tyre bead, sliding axially inwards along said inclined surface, may come out of its bead seat and fall inside the central well of the rim.

This drawback generally results in the vehicle coming to a standstill since the rim flange comes into contact with the road surface, making it impossible to control the vehicle.

The Applicant has found that the bead core according to the invention, even in the absence of the force exerted by the air under pressure, for example following puncturing of the tyre, is able to exert on the rim a force sufficient to keep the beads in the correct working position, namely in their bead seats.

The Applicant has in fact perceived that the preforming of at least one metallic threadlike element of a bead core ensures that the latter always remains elastically contracted against the bead seat.

In other words, even if, in the event of deflation, the bead core tends to slip axially towards the inside of the rim, the bead core according to the invention is able to follow the conicity of the bead seat owing to the increase in the elasticity range of the metallic material which forms it due to the preforming imparted.

Therefore, the bead core according to the invention ensures, at every moment and in every point of said bead seat, anchoring of the tyre to the rim so as to ensure safe driving even in the deflated condition.

For, the purposes of the present description, the term "preformed threadlike element" is understood as indicating a threadlike element which is deformed plastically, according to any method known n in the art, and in such a way that the longitudinal extension of said threadlike element has an undulating form.

For the purposes of the present description, the term "undulating form" is understood as indicating any form which is not straight. In this respect, undulating forms are regarded as including, for example, sinusoidal, helical and zigzag forms.

For the purposes of the present description, the term "preforming" is understood as indicating a deformation of the plastic type which a threadlike element undergoes as a result of a deforming action applied to said element.

For the purposes of the present description, the term "preforming ratio" is understood as indicating the ratio $L_1/L_0$, where $L_1$ is the distance between the opposite ends of a section of threadlike element in the deformed condition and $L_0$ is the distance between the opposite ends of the same section of threadlike element in the undeformed condition.

For the purposes of the present description, the term "flexibility" is understood as indicating the property of a material to be deformed elastically, at least locally, due to a force applied and to recover its initial configuration (which it had prior to application of said force) when said force is no longer applied.

Therefore, according to a first aspect, the present invention relates to a bead core for vehicle tyres, comprising at least one preformed, metallic, threadlike element.

Preferably, said threadlike element is preformed with a preforming ratio not greater than 0.99, and more preferably not greater than 0.98.

Preferably said preforming ratio ranges between 0.75 and 0.98, and more preferably between 0.85 and 0.95.

Tyres of different sizes may use threadlike elements with the same preforming ratio. However, on the basis of his own knowledge, a person skilled in the art is able to choose a specific preforming ratio for each individual tyre size.

Preferably, said metallic threadlike elements are made of steel.

In accordance with further embodiments of the invention, said metallic threadlike elements are made of aluminium or aluminium alloys.

In one embodiment thereof, the bead core according to the present invention is obtained from a single threadlike element preformed according' to a given preforming ratio.

In accordance with a further embodiment, the bead core according to the present invention is obtained from at least one cord having at least one metallic threadlike element preformed according to a given preforming ratio, this meaning that the remaining threadlike elements forming said at least one cord are of the non-preformed type.

In a further embodiment, the bead core according to the present invention is obtained from at least one cord, the threadlike elements of said at least one cord being all preformed. Preferably, said threadlike elements of said at least one cord are all preformed according to the same preforming ratio.

In accordance with a further embodiment of the present invention, if the bead core is obtained from a plurality of separate cords, at least one cord of said plurality of cords has threadlike elements all of the non-preformed type.

In a further embodiment, the bead core according to the present invention may comprise at least one cord comprising at least one preformed, metallic, threadlike element and at least one threadlike element of the textile type. Preferably, said at least one threadlike element of the textile type is arranged around said at least one preformed threadlike element of the metallic type.

Preferably, the threadlike elements, prior to undergoing a given preforming action, have a straight configuration.

Preferably, the deformations of the preformed threadlike elements are of the coplanar type, namely each preformed threadlike element lies in a plane.

Preferably, said threadlike elements are preformed so as to obtain preformed threadlike elements substantially devoid of sharp edges along their longitudinal extension. Said feature is particularly advantageous since the presence of said sharp edges results in an undesirable reduction in the breaking load of said threadlike elements.

Particularly preferred is a preforming according to substantially sinusoidal undulations. Preferably, said sinusoidal undulations have a wavelength of between 2.5 mm and 30 mm, and more preferably between 5 mm and 25 mm. Preferably, said sinusoidal undulations have a wave amplitude of between 0.12 mm and 1 mm. The wavelength and wave amplitude ranges referred to above may be measured directly on the non-rubberized threadlike element before it is inserted into the tyre or on the finished (vulcanized) tyre. Advantageously, the measurement of said parameters may be performed on the threadlike element by using a magnifying lens and a graduated scale (for example a graduated ruler). In the case where a finished (or vulcanized) tyre is to be analysed, it is necessary to extract the bead core from the tyre and to remove the rubberizing compound from the bead core by using suitable solvents, for example by treating it with dichlorobenzene at 100° C. for 12 hours. Should the bead core be obtained from at least one cord comprising at least one pair of threadlike elements, in order to perform a visual or instrumental analysis of said threadlike elements, it is necessary to unwind said cord and unravel, with due care, the individual threadlike elements forming said cord in order to locate the preformed threadlike element or the preformed threadlike elements present in said cord.

In an alternative embodiment, the deformation has a form which is not of the coplanar type, but for example of the helical type.

In order to obtain a preformed threadlike element according to the present invention, it is possible to use any one of the methods known in the sector. For example, it is possible to use toothed-wheel. devices of the type illustrated in U.S. Pat. No. 5,581,990 or to use the device described in patent application WO 00/39385, in the name of the same Applicant. Said device comprises a pair of pulleys, each provided with a plurality of facing lugs able to intermesh with each other over a predefined section so as to induce simultaneously an axial deformation and a flexural deformation in a threadlike element made to travel along the space lying between the lugs of the first pulley and the corresponding lugs of the second pulley. The abovementioned intermeshing action may be effected as a result of the movement of said pair of pulleys driven rotationally by said threadlike element.

According to a further aspect thereof, the present invention relates to a tyre for vehicle wheels, provided with a bead core which is particularly flexible and able to ensure a stable anchoring of said tyre on a respective rim as well as travelling of said tyre in safe conditions even if the latter should be operating in a substantially deflated conditions.

Therefore, the present invention relates, moreover, to a tyre for vehicle wheels, comprising:
- a carcass structure comprising at least one carcass ply, the ends of which are fastened to a pair of annular reinforcing elements, each of said annular reinforcing elements being incorporated in a respective bead of said tyre and comprising at least one metallic threadlike element;
- a tread band extending circumferentially around said carcass structure;
- a belt structure circumferentially located between said carcass structure and, said tread band; and
- at least one pair of sidewalls applied to said carcass structure in axially opposite positions; characterized in that said at least one metallic threadlike element is preformed.

In accordance with the present invention, the elasticity of the bead core is obtained by means of preforming of at least one threadlike element incorporated in said bead core.

In other words, said elasticity is attributable to the spring effect of the preformed threadlike elements which, having a length greater than their axial extension, when they are subjected to a tensile stress undergo initial straightening before reacting to the stress itself.

In fact, in the presence of an applied stress, for example the action of a lever during fitting/removal of a tyre onto/from a rim, each preformed threadlike element reacts to said stress, gradually reducing its preformed condition until it is substantially eliminated, namely until the straight initial configuration (i.e. that existing before preforming), close to the breaking configuration of the threadlike element, is reached.

The Applicant has moreover found that the use of a steel with a high carbon content (for example up to a maximum of 0.96%) allows the tensile strength of the threadlike element forming part of the bead core to be increased considerably, without the flexibility, elasticity and ductility properties of said threadlike element being adversely affected.

According to a further aspect, the present invention relates to a method for controlling the behavior, during travel, of a tyre for vehicle wheels in an at least partially deflated condition, for example in the case of a puncture, said tyre comprising a carcass structure including at least one carcass ply, the ends of which are fastened to a pair of annular reinforcing elements, each of said annular reinforcing elements being incorporated in a respective bead of said tyre and comprising at least a one metallic threadlike element, said method being characterized in that it uses for at least one of said annular reinforcing elements at least one preformed, metallic, threadlike element.

As mentioned further above, in the event of deflation of the tyre, said method ensures suitable anchoring of the latter to the respective rim owing to the gripping force which the bead core, having at least one preformed threadlike element, is able to exert on said rim.

The Applicant has in fact perceived that preforming at least one threadlike element of the bead core of a tyre allows a gripping action per se of said bead core on the rim (namely as a result of the abovementioned preforming operation), said gripping action due to preforming being in addition to the anchoring action due to the pressure of the tyre inflation air pressure which keeps each bead pressed against the surface of the bead seat in the rim.

From that stated above, and as mentioned above, it is obvious that, in the normal operating conditions of the tyre, the gripping action of the bead core is increased, compared to traditionally used solutions, owing to the presence of said preforming effect, whereas in the case the tyre is travelling in a partially deflated condition, said gripping action, since the effect of the pressurised air is no longer present, is advantageously ensured by the constricting effect which preforming of at least one metallic threadlike element of the bead core produces on the rim.

The present invention, owing to the abovementioned anchoring action even in the partial absence of the pressurised inflating air, is advantageously applicable to tyres of the self-supporting type provided with supporting inserts. Said supporting inserts are principally envisaged along the sidewalls of the tyre and are such as to ensure safe travel of the vehicle even in the case of loss of pressure by said tyre.

A type of self-supporting tyre is, for example, described in the document EP-542,252 in the name of the Applicant.

The present invention is, moreover, advantageously applicable also to tyres forming part of vehicle wheels provided with suitable safety supports, for example mounted on a rim, able to support the tyre in the event of a loss of inflation pressure. Such a type of tyre is, for example, described in the document EP-1,080,948 in the name of the same Applicant.

BRIEF DESCRIPTION OF THE DRAWINGS

Further features and advantages will appear more clearly with reference to the detailed description of an example of a tyre and bead core according to the present invention. Said description, given hereinbelow, refers to the accompanying drawings which are provided solely by way of a non-limiting example and in which.

DETAILED DESCRIPTION OF THE EXEMPLARY EMBODIMENTS

Figure 1:
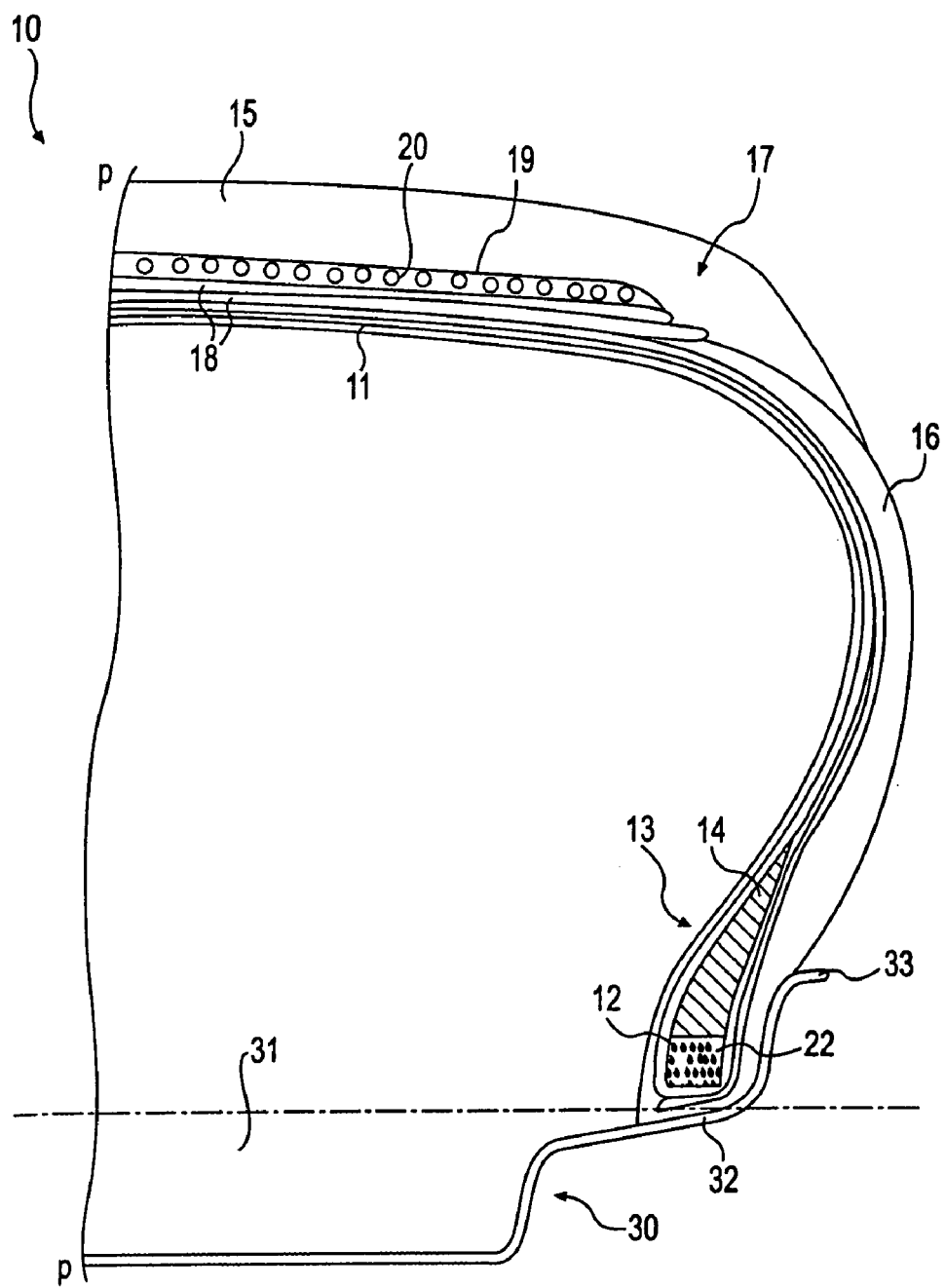
FIG. 1 shows a partial cross-sectional view of a tyre according to the present invention.

FIG. 1 shows a partial cross-sectional view of a tyre 10 according to the invention. For the sake of greater clarity of the description, the cross-section in FIG. 1 is shown only partially in that it is symmetrical with respect to the equatorial plane p-p of the tyre.

The tyre 10 includes a carcass comprising a carcass ply 11, the ends of which are associated with a pair of bead cores 12 which are axially spaced from each other and each of which is incorporated in a respective bead 13, in a position radially internal to said tyre. Said bead 13 comprises, in addition to the bead core 12, a bead filler 14 in a position radially external to said bead core 12.

Preferably, the carcass is of the radial type, namely incorporates reinforcing cords arranged in a direction substantially perpendicular to the equatorial plane p-p of the tyre.

The tyre 10 comprises, moreover, a tread band 15, located on the crown of said carcass, and a pair of axially opposite sidewalls 16, each arranged between the respective bead 13 and the tread band 15.

Between the carcass ply 11 and the tread band 15, the tyre 10 comprises, moreover, a belt structure 17 which, in the example according to FIG. 1, envisages two radially superimposed belt strips 18 and a reinforcing layer 19. In detail, the belt strips 18, which are radially superimposed on each other, incorporate a plurality of reinforcing cords, which are typically metallic and obliquely oriented with respect to the equatorial plane p-p of the tyre, parallel with each other in each strip and intersecting with those of the adjacent strip so as to form a predetermined angle with respect to a circumferential direction. The reinforcing layer 19, which is radially external to said pair of belt strips 18, has reinforcing elements 20 which are substantially parallel to each other and parallel to the equatorial plane p-p of the tyre, namely such as to form an angle which is substantially zero (said reinforcing layer 19 is also defined as 0° layer) with a circumferential direction of the tyre. Generally, in a car tyre, said reinforcing elements 20 are of the textile type. The case may-also be envisaged where more than one reinforcing layer 19 is present (not shown).

In the case of tubeless tyres, in a position radially internal to said carcass ply 1, a rubberized layer, the so-called "liner" (not shown in FIG. 1), is also envisaged, said layer being able to provide the tyre 10, during use, with the necessary impermeability to air.

As partially shown in FIG. 1, the tyre 10 is mounted on a conventional rim 30 so as to form a tyre wheel, said rim 30 comprising a central well 31, a bead seat 32 and a flange 33.

The bead core 12 shown in FIG. 1 is of the "Alderfer" type with a cross-sections which has a symmetrical and geometrically regular form. In the example shown, said bead core 12 is formed by performing four wound turns of a small band comprising four threadlike elements 22, preformed according to the invention, so as to form four layers which are radially superimposed ("4×4" structure).

Figure 2:
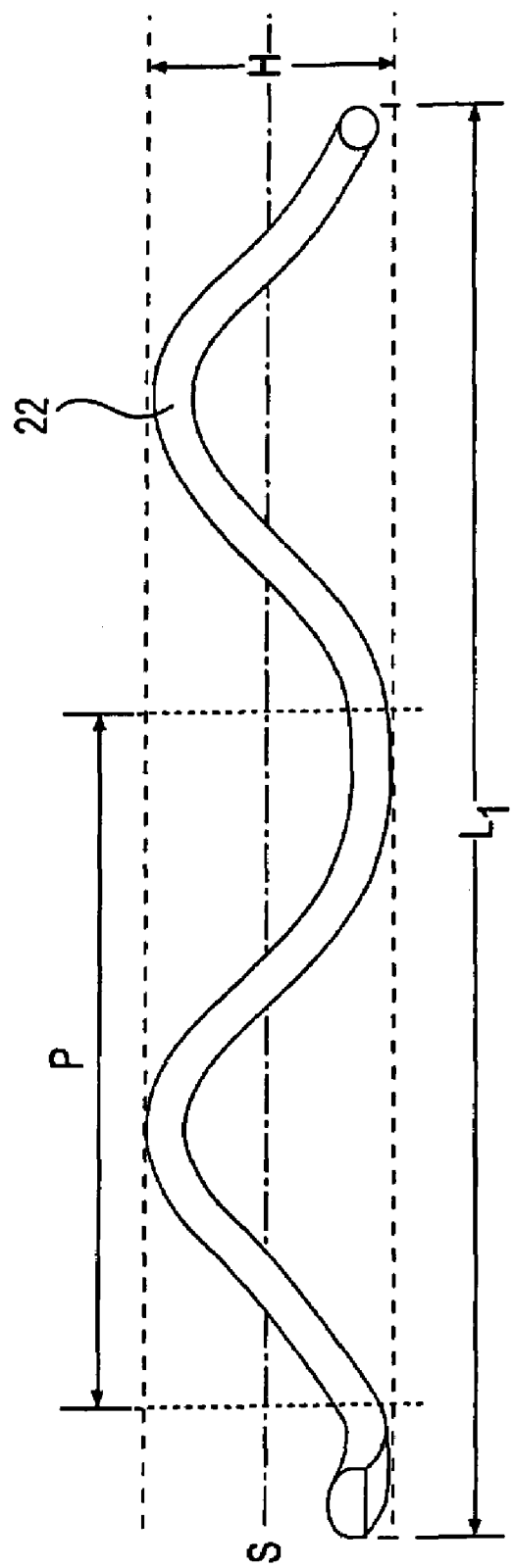
FIG. 2 shows a preformed threadlike element which can be used in a bead core structure according to the present invention.

FIG. 2 shows a threadlike element 22 which is sinusoidally preformed in accordance with the present invention.

As mentioned above, said deformations, generally in the form of periodic deviations from a straight line, may be obtained in any known form. Preferably, said deformations are of the coplanar type. Even more preferably, said deformations consist of substantially sinusoidal undulations (such as those illustrated in FIG. 2) having a wavelength (or pitch) P and a wave amplitude H.

For the purposes of the present invention, "wavelength P" is to be understood as the length of the minimum section which is repeated periodically, and "wave amplitude H" is to be understood as meaning twice the amplitude of maximum transverse deviation (assumed to be equal in both directions) of the threadlike element from the centre axis S (see FIG. 2).

Generally, the wave amplitude H is between 0.12 mm and 1 mm, preferably between 0.14 mm and 0.60 mm.

Generally, the preformed threadlike elements according to the present invention have a diameter D of between 0.05 mm and 0.80 mm, preferably between 0.10 mm and 0.50 mm.

Given the preforming ratio $L_1/L_0$, the amplitude H and the diameter D, the pitch P of the preformed threadlike element is precisely defined.

As mentioned above, said threadlike elements are preferably made of steel. In the case where the diameter of the threadlike element is between 0.4 inn and 0.1 mm, the breaking strength of a standard NT (normal tensile) steel ranges between about 2,600 N/mm$^2$ (or 2,600 MPa-MegaPascal) and about 3,200 N/mm$^2$, the breaking strength of a HT (High Tensile) steel ranges, between about 3,000 N/mm$^2$ and about 3,600 N/mm$^2$, the breaking strength of a SHT (Super High Tensile) steel ranges between about 3,300 N/mm$^2$ and about 3,900 N/mm$^2$, the breaking strength of a UHT (Ultra High Tensile) steel ranges between about 3,600 N/mm$^2$ and about 4,200 N/mm$^2$. Said breaking strength values depend in particular on the quantity of carbon contained in the steel.

Generally, said threadlike elements are provided with a brass coating (Cu of, between 60% and 75% by weight, Zn of between 40% and 25% by weight), having a thickness of between 0.10 um and 0.50 µm. Said coating ensures better adhesion of the threadlike element to the rubberizing compound and provides for protection against corrosion of the metal, both during production of the tyre and during use thereof. Should it be necessary to ensure a greater degree of protection against corrosion, said threadlike elements may be advantageously provided with an anti-corrosive coating other than brass, able to ensure a greater corrosion resistance, such as, for example, a coating based on zinc, zinc/manganese (ZnMn) alloys, zinc/cobalt (ZnCo) alloys or zinc/cobalt/manganese (ZnCoMn) alloys.

Preferably the bead cores according to the present invention are obtained from cords having a compact structure of the type n×D, where n is the number of threadlike elements forming the cord and D is the diameter of each threadlike element. Preferably n ranges between 2 and 27. Preferably D ranges between 0.1 mm and 0.8 mm. Preferably, the stranding pitch of said threadlike elements ranges between 2.5 mm and 30 mm, more preferably between 5 mm and 25 mm.

The bead core according to the present invention, comprising at least one preformed, metallic, threadlike element, is not limited to a specific bead core structure, but is applicable to any bead core structure of the prior art.

For a further description of the invention, two illustrative and non-limiting examples of embodiments of the bead-core according to the invention are provided hereinbelow and compared with a bead core of the prior art (comparative bead core).

In detail, the following three bead cores were prepared: a) a reference bead core A (comparative example) of the "Alderfer" type obtained by means of coiling (4 wound turns) of a small band comprising 4 non-preformed threadlike elements, i.e. having a straight extension (preforming ratio $L_1/L_0$ equal to 1), made of High Tensile steel, with a diameter of 0.89 mm; b) a bead core B according to the invention obtained by performing 20 wound turns (5 turns in the axial direction and 4 in the radial direction) of a cord comprising 5 threadlike elements (left-handed stranding pitch of the cord, equal to 16 mm), made of Normal Tensile steel, with a diameter of 0.38 mm, each threadlike element having been preformed sinusoidally (wave amplitude H of 0.47 mm and preforming ratio $L_1/L_0$ of 0.95); c) a bead core C according to the invention obtained by performing 9 wound turns (3 turns in the axial direction and 3 in the radial direction) of a cord comprising 12 threadlike elements (left-handed stranding pitch of the cord, equal to 16 mm), made of Normal Tensile steel, with a diameter 0.38 mm, each threadlike element having been preformed sinusoidally (wave amplitude H of 0.48 mm and preforming ratio $L_1/L_0$ of 0.94).

Table 1 shows some characteristics of the threadlike element used in the bead core A and of the bead core itself thus obtained.

TABLE 1

| Properties | Bead core A |
|---|---|
| Breaking load of the threadlike element (N) | 1460 |
| Elongation at break of the threadlike element (%) | >5% |
| Elongation at yield point of the threadlike element (%) | 0.2% |
| Theoretical breaking load of the bead core (N) | 23,360 |

"Theoretical breaking load of the bead core" is understood as the sum of the theoretical loads (i.e. of the tensile strength values), expressed in N, of the elements forming the bead core.

By way of example, in the specific case of the reference bead core A (see Table 1), the value of the theoretical load at break of the bead core (i.e. 23,360 N) was obtained by multiplying the breaking load value of the individual threadlike element (i.e. 1460 N) by the overall number of the threadlike elements forming part of the bead core A (i.e. 16 threadlike elements, consisting of 4 wound turns of a small band comprising 4 threadlike elements).

Table 2 shows some characteristics of the cords used in the bead cores B and C, as well as of the bead cores themselves.

TABLE 2

| Properties | Bead core B | Bead core C |
|---|---|---|
| Breaking load of the core (N) | 1,170 | 2,720 |
| Elongation at break of the cord (%) | >5% | >5% |
| Elongation at yield point of the cord (%) | >0.5% | >0.5% |
| Theoretical breaking load of the bead core (N) | 23,400 | 24,480 |

If the reference bead core A and the bead cores B and C according to the invention are compared, it can be noted how the use of preformed threadlike elements according to the invention results in an advantageous increase in the flexibility of the bead core, while ensuring the necessary structural strength thereof. In detail, from a comparison of the abovementioned Tables 1 and 2 it can be seen that there is an increase in the flexibility of the bead cores according to the invention B and C with respect to the comparative bead core A since, owing to the preformed condition of the threadlike elements of the bead cores B and C according to the invention, there is an increase in the elastic range (see elongation at yield point) of the elements forming the bead cores B and C of the invention with respect to the elastic range of the threadlike elements forming the reference bead core A. Moreover, it should be emphasized that said increase in the flexibility of the bead cores according to the invention was obtained while keeping substantially unchanged or even increasing the structural strength of the bead core as demonstrated by the theoretical load at break values shown in the abovementioned Tables 1 and 2. In particular it may be noted how the theoretical load at break of the bead core C, i.e. of the bead core with a smaller number of wound turns, is markedly greater than that of the comparative bead core A owing to the greater breaking load of the preformed cord of the bead core C with respect to the threadlike element of the bead core A.

It should be emphasized that said advantageous result was obtained despite the use of a comparative bead core A in which the threadlike elements were made of a nobler steel (HT) and had a greater diameter (0.89 mm) with respect to the steel (NT) and the diameter (0.38 mm) of the threadlike elements of the bead cores B and C according to the invention.

Figure 3:
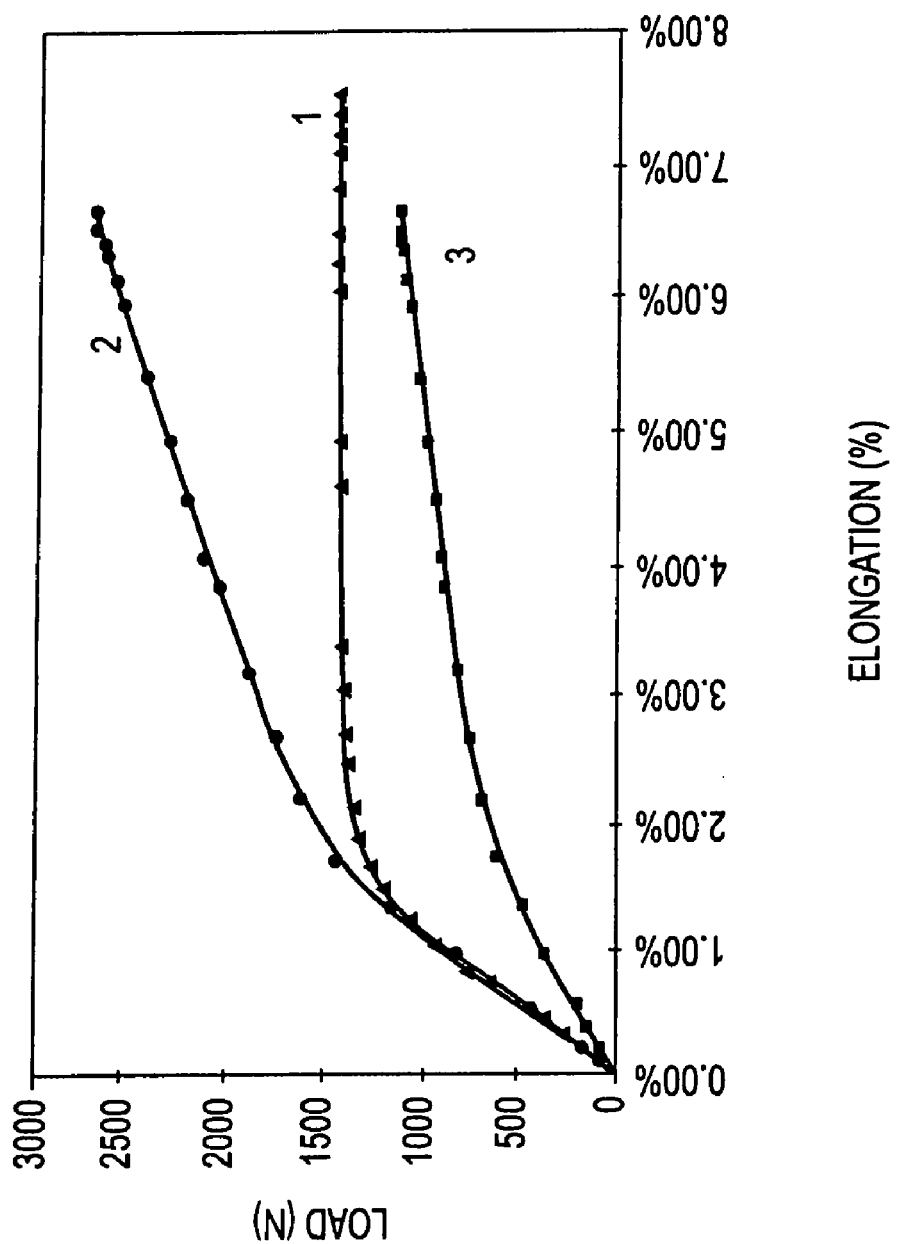
FIG. 3 shows a load/deformation diagram relating to a comparative cord and to two cords according to the invention.

By way of confirmation of that expressed in the above tables, FIG. 3 shows, respectively, the load-deformation diagrams for the threadlike element of the comparative bead core A (curve 1), of the cord of the bead core B according to the invention (curve 3) and of the cord of the bead core C according to the invention (curve 2). The elongation values (expressed as a percentage) are shown along the x axis, while the loads applied (expressed in Newton) are shown along the y axis.

As may be noted, the threadlike elements of the bead cores according to the invention maintain an elastic reaction for elongation values greater than about 1.50%, while the threadlike element of the prior art, in the case of values higher than said threshold, is already working within the plastic deformation range, i.e. along the section parallel to the x axis, where it extends until breakage without any increase in the resistance to the load applied.

The bead core according to the present invention offers several advantages.

Firstly, said bead core, as mentioned above, is particularly flexible and is able to undergo elastic deformation while maintaining, at the same time, a high structural strength.

This is advantageous not only during the conventional fitting/removal operations of a tyre onto/from a respective rim, but also, as already mentioned, in the event of deflation of the tyre.

Moreover, if the bead core structure according to the present invention is obtained from at least one cord comprising at least one preformed threadlike element, a further advantage of the present invention consists in that preforming of said at least one threadlike element results in optimum rubberizing of said at least one cord and, consequently, of said bead core structure. Said aspect is particularly advantageous since it allows the elimination, or at least a considerable reduction, of corrosion phenomena affecting said threadlike elements of said structure.

The invention claimed is:

1. A tyre for a vehicle wheel, comprising:
   a carcass structure;
   a tread band extending circumferentially around the carcass structure;
   a belt structure circumferentially located between the carcass structure and the tread band; and
   at least one pair of sidewalls applied to the carcass structure in axially opposite positions;
   wherein the carcass structure comprises at least one carcass ply,
   wherein ends of the carcass ply are fastened to a pair of annular reinforcing elements,
   wherein each annular reinforcing element is incorporated in a respective bead of the tyre, and
   wherein each annular reinforcing element comprises at least one cord, and
   wherein the at least one cord comprises a plurality of thread elements stranded together and including at least one preformed metallic thread element, the preformed metallic thread element being deformed plastically so as to have a coplanar undulating form along a longitudinal extension of the preformed metallic thread element before formation of the cord.

2. The tyre of claim 1, wherein the at least one metallic thread element is preformed with a preforming ratio less than or equal to 0.99:1.

3. The tyre of claim 1, wherein the at least one metallic thread element is preformed with a preforming ratio less than or equal to 0.98:1.

4. The tyre of claim 1, wherein the at least one metallic thread element is preformed with a preforming ratio greater than or equal to 0.75:1 and less than or equal to 0.98:1.

5. The tyre of claim 1, wherein the at least one metallic thread element is preformed with a preforming ratio greater than or equal to 0.85:1 and less than or equal to 0.95:1.

6. The tyre of claim 1, wherein the at least one metallic thread element consists of a metal comprising steel, aluminum, or an aluminum alloy.

7. The tyre of claim 1, wherein the at least one metallic thread element comprises a coating chosen from the group comprising brass, zinc, zinc/manganese alloys, zinc/cobalt alloys, and zinc/cobalt/manganese alloys.

8. The tyre of claim 1, wherein the undulating form is of a zigzag type.

9. The tyre of claim 1, wherein the undulating form is of a substantially sinusoidal type.

10. The tyre of claim 9, wherein the substantially sinusoidal form comprises a wavelength greater than or equal to 2.5 mm and less than or equal to 30 mm.

11. The tyre of claim 9, wherein the substantially sinusoidal form comprises a wavelength greater than or equal to 5 mm and less than or equal to 25 mm.

12. The tyre of claim 9, wherein the substantially sinusoidal form comprises a wave amplitude greater than or equal to 0.12 mm and less than or equal to 1 mm.

13. The tyre of claim 9, wherein the substantially sinusoidal form comprises a wave amplitude greater than or equal to 0.14 mm and less than or equal to 0.60 mm.

14. The tyre of claim 1, wherein the at least one cord comprises at least one non-preformed thread element stranded together with the at least one preformed metallic thread element.

15. The tyre of claim 14, wherein the at least one non-preformed thread element is of a textile type.

16. The tyre of claim 1, wherein the at least one preformed metallic thread element comprises a diameter greater than or equal to 0.05 mm and less than or equal to 0.80 mm.

17. The tyre of claim 1, wherein the at least one preformed metallic thread element comprises a diameter greater than or equal to 0.10 mm and less than or equal to 0.50 mm.

* * * * *